United States Patent

Watanabe et al.

Patent Number: 5,339,682
Date of Patent: Aug. 23, 1994

[54] APPARATUS AND METHOD OF TESTING ANTI-LOCK BRAKE SYSTEM

[75] Inventors: Shinichi Watanabe; Takao Shibayama, both of Sayama; Kimitake Uzuyama, Sayamashi; Kazuyuki Fukamachi, Sayama; Keiichiro Maekawa, Sayama; Masaru Maruo, Sayama, all of Japan

[73] Assignee: Honda Giken Kogyo Kabushiki Kaisha, Tokyo, Japan

[21] Appl. No.: 852,960

[22] Filed: Mar. 17, 1992

[30] Foreign Application Priority Data

| Apr. 2, 1991 | [JP] | Japan | 3-069996 |
| Apr. 2, 1991 | [JP] | Japan | 3-069997 |
| May 16, 1991 | [JP] | Japan | 3-111946 |
| Feb. 12, 1992 | [JP] | Japan | 3-025521 |

[51] Int. Cl.$^5$ ............................. G01L 5/28
[52] U.S. Cl. ................................... 73/123
[58] Field of Search ................... 73/123–126; 364/426.02

[56] References Cited

U.S. PATENT DOCUMENTS

| 2,022,340 | 11/1935 | Deane | 73/125 |
| 2,327,617 | 8/1943 | Bennett | 73/125 |
| 3,465,580 | 9/1969 | Cady et al. | 73/125 |
| 3,473,374 | 10/1969 | Leeper | 73/124 |
| 3,498,122 | 3/1970 | Odier et al. | 73/125 |
| 3,602,042 | 8/1971 | Mitchell | 73/126 |
| 3,979,950 | 9/1976 | Maxwell | 73/126 |
| 4,050,299 | 9/1977 | Maxwell | 73/126 |
| 4,379,331 | 4/1983 | Watson | 364/426.02 |
| 4,932,252 | 6/1990 | Bovenlander et al. | 73/123 |
| 4,986,114 | 1/1991 | Rothmann et al. | 73/117 |

FOREIGN PATENT DOCUMENTS 63-7345 1/1988 Japan.

OTHER PUBLICATIONS

English Abstract of Published Unexamined Patent Application No. 13131/1986.
English Abstract of Published Unexamined Patent Application No. 21234/1990.

*Primary Examiner*—Robert Raevis
*Attorney, Agent, or Firm*—Armstrong, Westerman, Hattori, McLeland & Naughton

[57] ABSTRACT

An apparatus for testing an anti-lock brake system has rolls and device for detecting rotational changes of the rolls. The test is performed by running a vehicle having mounted thereon the anti-lock brake system while wheels of the vehicle are placed on the rolls, actuating the anti-lock brake system when a predetermined speed has been attained, and judging operating conditions of the anti-lock brake system from rotational changes of the rolls at the time of braking. In the apparatus, the friction coefficient of each of the rolls is set to such a value that a frictional force to act between each of the rolls and each of the wheels at the time of braking exceeds an inertia force of each of the rolls. Also the inertia weight of each of the rolls is set to such a value that deceleration of each of the wheels at the time of braking can be increased to a predetermined level which is required to start an anti-lock control and that each of the wheels does not stop before the completion of a first braking pressure reduction by the anti-lock control.

8 Claims, 11 Drawing Sheets

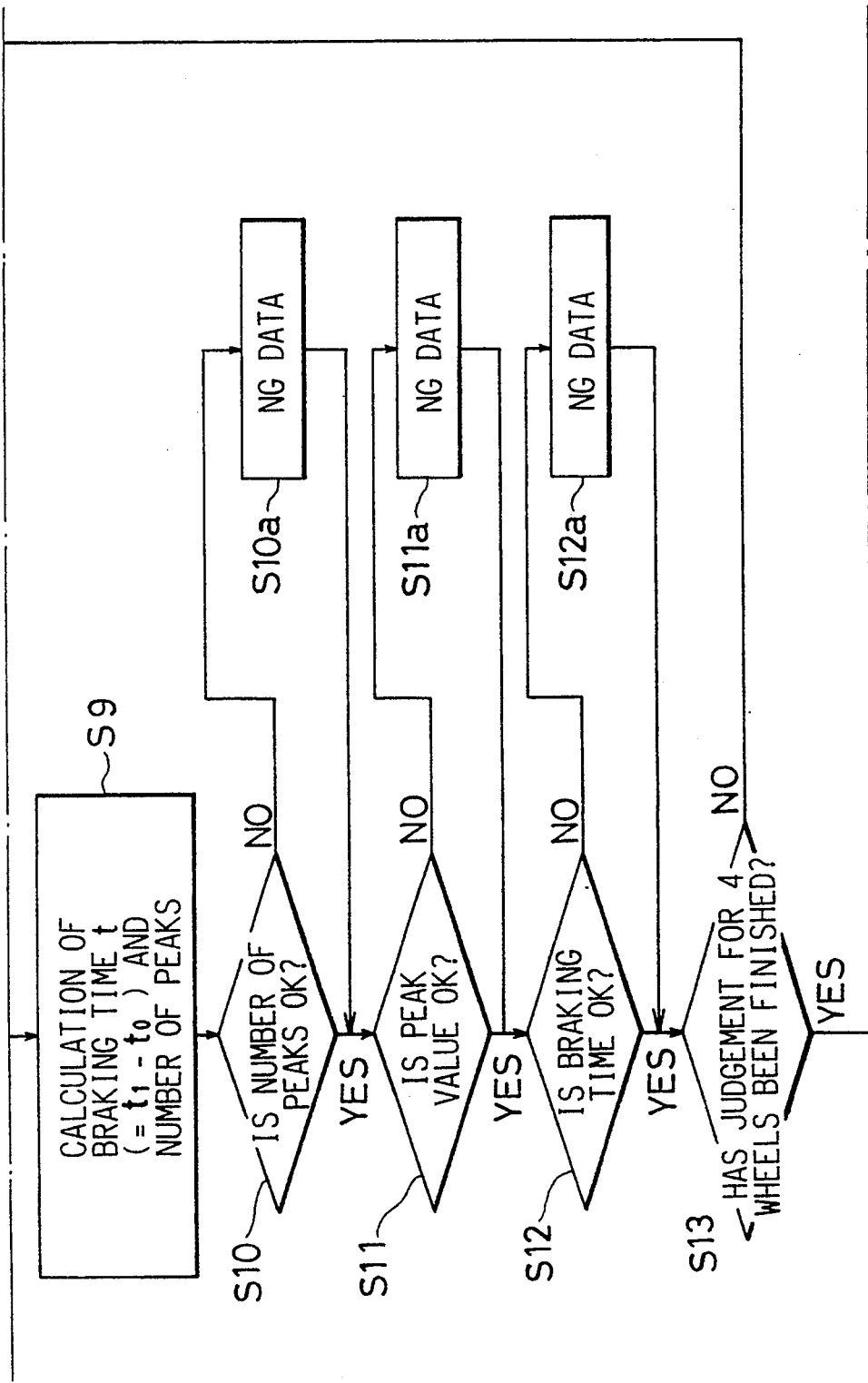

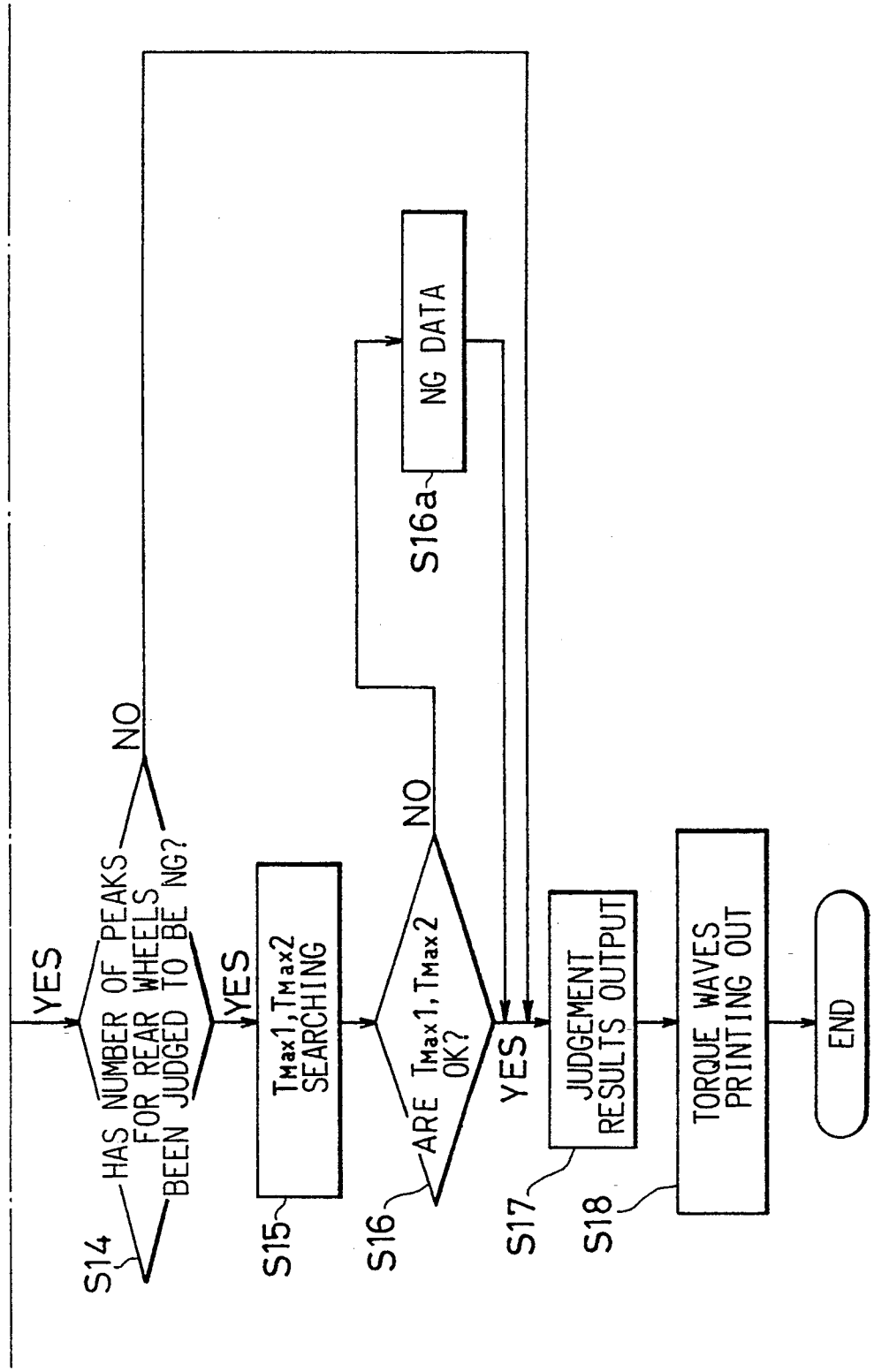

FIG. 8(a)
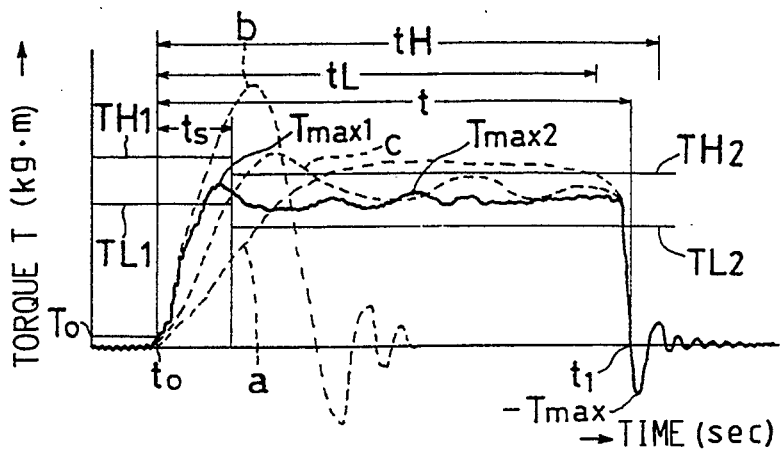
FIG. 8(b)
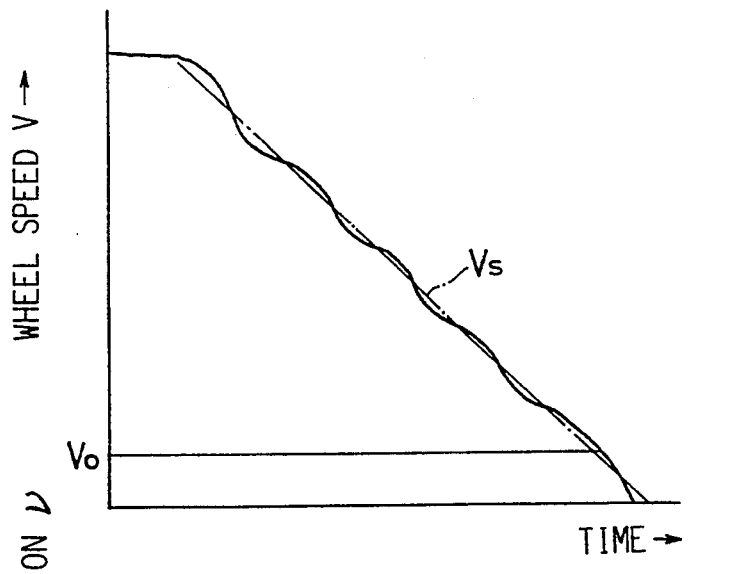
FIG. 8(c)
FIG. 8(d)
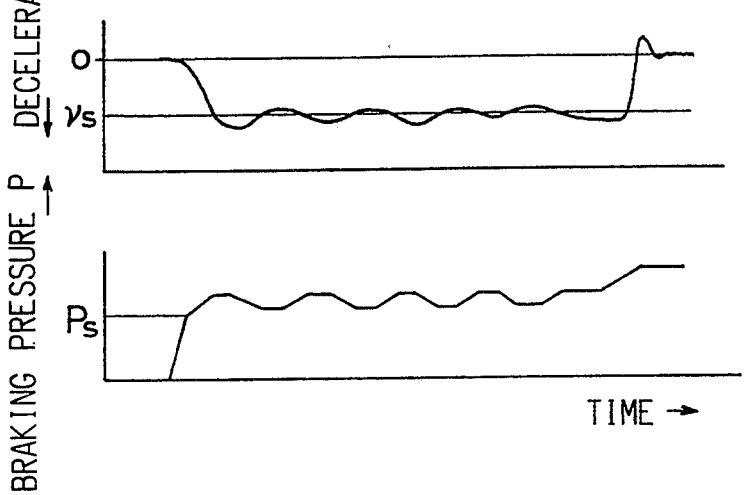

APPARATUS AND METHOD OF TESTING ANTI-LOCK BRAKE SYSTEM

BACKGROUND OF THE INVENTION

This invention relates to an apparatus and a method of testing an anti-lock brake system or anti-wheel-lock brake system under a condition that wheels of a vehicle such as a motorcar are placed on rolls.

As this kind of apparatus, there is known in Japanese Published Unexamined Patent Application No. 233349/1988 an apparatus in which each of rolls for mounting thereon each of the wheels of the vehicle is made up of a pair of front and rear split rolls to be rotated in interlocking with each other. The friction coefficient of the rear split rolls is made small so that, when the centers of the wheels are offset rearwards at the time of braking due to the relationship between the braking force of the wheels and the rotational force of the rolls, a slip is caused to occur between the rear split rolls and the wheels. The wheels are thus brought into a locked condition so that a reduction in the braking pressure by anti-lock control is performed. When the centers of wheels are moved forwards due to the lowering in the braking force as a consequence of this pressure reduction, the wheels are accelerated by the front split rolls and the braking pressure is increased. By this increase in the braking pressure, the wheels are again offset backwards to cause a slip relative to the rear split rolls, whereby the increase and reduction in the braking pressure are repeated.

According to the above-mentioned conventional apparatus, the increase and reduction in the braking pressure by the anti-lock control is realized in the same manner as if the vehicle were actually running on the road, and the operating conditions of the anti-lock brake system can be judged from the changes in the rotational speed of the wheels. However, in this apparatus, since the wheels slip relative to the rolls, the rotational speeds of the wheels do not coincide with those of the rolls. Therefore, in order to detect the rotational speeds of the wheels, it is necessary either to pick up signals from wheel speed sensors which are mounted in advance on the vehicle for the purpose of controlling the anti-lock brake system or to separately mount sensors on the vehicle. This results in troublesome preparation works.

As can be seen in Japanese Published Unexamined Patent Application No. 99879/1979, the anti-lock brake system performs the following control. When the deceleration of the wheels has exceeded a standard deceleration, the increase in the braking pressure is stopped. At the same time, that standard speed at the time of braking which is determined on the basis of a pseudo-speed of the vehicle to be calculated by the rotational speed of each wheel, is compared with the wheel speed. When the wheel speed is below the standard speed at that instant, the braking pressure is reduced until the deceleration lowers to or approaches the standard deceleration. As soon as the wheel speed has exceeded the standard speed at that instant, the braking pressure is increased.

Accordingly, even if the wheels are not caused to slip on the rolls, the anti-lock brake system is operated if the inertia weight of the rolls is made small so that the deceleration of the wheels at the time of braking increases above a predetermined level. In this case, when the inertia weight of the rolls is too small, the wheels come to a stop before the braking pressure is actually reduced, due to the delay in response for increasing or reducing the braking pressure.

OBJECT AND SUMMARY OF THE INVENTION

Taking the above disadvantages into consideration, this invention has an object of providing an apparatus for testing an anti-lock brake system in which the anti-lock brake system can be operated without causing the wheels to slip on the rolls so that the rotational speed of the rolls is made to coincide with that of the wheels, whereby the operating conditions of the anti-lock brake system can be judged from the rotational speed of the rolls.

In order to attain the above-mentioned object, this invention apparatus for testing an anti-lock brake system has rolls and means for detecting rotational changes of each of the rolls, the testing comprising: running a vehicle having mounted thereon the anti-lock brake system while each of the wheels of the vehicle is placed on each of the rolls; actuating the anti-lock brake system when a predetermined speed has been attained; and judging operating conditions of the anti-lock brake system from rotational changes of each of the rolls at a time of braking; in which apparatus a friction coefficient of each of the rolls is set to such a value that a frictional force to act between each of the rolls and each of the wheels at the time of braking exceeds an inertia force of each of the rolls; and an inertia weight of each of the rolls is set to such a value that deceleration of each of the wheels at the time of braking can be increased to a predetermined level which is required to start an anti-lock control and that each of the wheels does not stop before the completion of a first braking pressure reduction by the anti-lock control.

In this invention, the inertia weight of each of the rolls means the inertia weight inclusive of all the rotating members such as each of the rolls, each of the fly wheels which rotate integrally therewith, or the like.

According to this invention, since the frictional force to act, at the time of braking, between the roll and the wheel exceeds the inertia force of the roll, there occurs no slip between the wheel and the roll. Therefore, the rotational changes of the wheel can be accurately detected from the rotational changes of the roll.

In addition, since the inertia weight of the roll is set as described above, the anti-lock control can be initiated when the deceleration of the wheel at the time of braking exceeds the above-mentioned predetermined level, even if the wheel does not slip on the roll. Furthermore, even if there is a delay in the response for increasing or reducing the braking pressure by the anti-lock control, there is no such a possibility that the wheel comes to a stop before the first pressure reduction or during the pressure reduction. When the wheel speed exceeds the standard speed after the pressure reduction, the braking pressure is increased. In this manner, the reduction and increase in the braking pressure is performed at least once, and the operating conditions of the anti-lock brake system can be judged by detecting the rotational changes in the wheel depending on the increase and reduction in the braking pressure in terms of the rotational changes in the roll.

In more detail, in testing the anti-lock brake system, the vehicle is run or driven under a condition that each of the wheels are mounted on each of the rolls and, when a predetermined speed has been attained, the brakes are operated to detect the deceleration of each of the rolls during the braking operation.

When the rotational speed of the wheel is decreased as a result of application of the braking pressure, the rotational speed of the roll which rotates at the same rotational speed as that of the wheel is also decreased. The time of start of the braking operation can be detected by the rise from zero level of the deceleration. When the roll comes to a stop, the elastic energy which is stored in the inertia system comprising the wheel and the roll is released whereby the deceleration once lowers below the zero level. Therefore, the time of stop of the roll can thus be detected. Also, from the time difference between the above-mentioned two points, the braking time can be computed. If the anti-lock brake system operates normally, the rotational speed of the roll is decelerated in accordance with the deceleration characteristics of the above-mentioned standard speed. It follows that the braking time does not fall within an allowable range of a standard braking time which is set in accordance with the deceleration characteristics, the anti-lock brake system can be judged to be unacceptable.

However, even if there should occur abnormal conditions in which the brakes are operated under normal braking conditions without the above-mentioned increase or reduction control of the braking pressure, when the braking pressure is insufficient, the wheel speed is sometimes decelerated according to the characteristics that are close to the predetermined deceleration characteristics. As a result, the deceleration time falls within the allowable range of the standard braking time.

When the wheel speed falls below the standard speed and the braking pressure is consequently reduced, the deceleration of the wheel, i.e., of the roll is decreased and a maximum peak appears just before the decrease. Therefore, the number of increase or reduction control of the braking pressure can be detected from the number of peaks. When the deceleration of the roll becomes large due to a delay in the response for reducing the braking pressure or the like, the value of the peak of the deceleration also increases.

Therefore, according to another aspect of this invention, the acceptability or unacceptability of the anti-lock brake system is judged by: measuring a braking time required from a time of start of braking operation to a time of stop of each of the rolls 1 measuring the number of peaks of deceleration and values of the peaks which occur during the braking time, the peaks being defined to occur when the deceleration of each of the rolls changes beyond a predetermined level; and comparing the braking time, the number of peaks and the values of the peaks, all being respectively measured in the preceding steps, with respectively set standard values. According to this feature, the acceptability or unacceptability of the anti-lock brake system can accurately be judged. In addition, the cause of malfunctioning can also be estimated based on acceptability or unacceptability patterns to show which of the braking time, the number of peaks and the values of the peaks is/are acceptable and which is/are unacceptable.

In the rear wheel brakes, there is provided, in the hydraulic system for the brakes, a proportioning control valve (abbreviated as PCV) which operates to make gradual the pressure increase characteristics in an area above a predetermined pressure in the braking pressure so that the locking of the rear wheels hardly occurs. In such an arrangement, the width of the increase and reduction of the braking pressure becomes small. Consequently, the deceleration of the roll does not show such a large change in the peak as will enable to distinguish it from a change in deceleration which occurs due to a minor slip between the wheel and the roll, or the like. In addition, when the braking pressure is finely controlled so that the wheel speed is decelerated at substantially the same deceleration as the deceleration characteristics of the standard speed, there also does not appear in the deceleration of the roll a distinguishable change in the peak.

In such a case, it is considered to make a judgement on acceptability or unacceptability based on the braking time required from the time of start of braking operation to a time of stop of the roll. However, even if the brakes are applied under a normal braking condition in which the anti-lock brake control does not work, the braking time sometimes falls within the allowable range if the braking force is insufficient. It follows that the acceptability or unacceptability of the anti-lock brake system cannot be judged from the braking time alone.

Therefore, according to still another aspect of this invention, the acceptability or unacceptability of the anti-lock brake system is judged by: measuring a braking time required from a time of start of braking operation to a time of stop of each of the rolls; measuring a maximum deceleration of each of the rolls that occurs within a time from the start of braking operation to the end of a predetermined set time; and comparing the braking time and the maximum deceleration, measured in the preceding steps, with respectively set standard values.

When the braking force is insufficient, the deceleration of the roll does not increase to a predetermined value within the predetermined set time from the time of start of braking operation and, if the anti-lock brake system does not work, the deceleration largely increases. It is therefore possible to judge whether the anti-lock brake system is acceptable or not by checking the maximum deceleration that occurs within the set time and the braking time.

When there is a delay or the like in the response for controlling the braking pressure, the width of the changes in deceleration increases, resulting in a poor feeling of braking operation. Therefore, it is preferable to see whether the deceleration falls within the tolerable range during the time after the lapse of the set time until the roll comes to a stop to judge whether the operating feeling of the anti-lock brake system is acceptable or not. In brakes which are provided in the hydraulic system thereof with the PCV, the increase in the deceleration is restrained by the PCV effect. Therefore, without looking at the entire changes in deceleration until the roll comes to a stop, it is possible to judge the operating condition by looking at the maximum deceleration that occurs during that period of time.

Further, in the anti-lock brake system it is normal practice to release the anti-lock control when the pseudo-speed to be computed by the rotational speed of each of the wheels has lowered to a predetermined low speed and to stop the wheels under the normal braking conditions. At the time of this stopping, the elastic energy stored in the inertia system comprising each of the wheels and each of the rolls is released, so that the deceleration of the roll once lowers below the zero level. The larger is the deceleration just before the stopping, the larger becomes the amount of this lowering. Therefore, the acceptability or unacceptability of the feeling of stopping can be judged by whether the amount of this lowering of the deceleration below the zero level is below the standard value or not.

BRIEF DESCRIPTION OF THE DRAWINGS

The above and other objects and the attendant advantages of this invention will become readily apparent by reference to the following detailed description when considered in conjunction with the accompanied drawings wherein:

FIGS. 8a, 8b, 8c, 8d are diagrams showing torque waves and changes in wheel speed, wheel deceleration and braking pressure in the rear wheels.

DETAILED DESCRIPTION OF PREFERRED EMBODIMENTS

Figure 1:
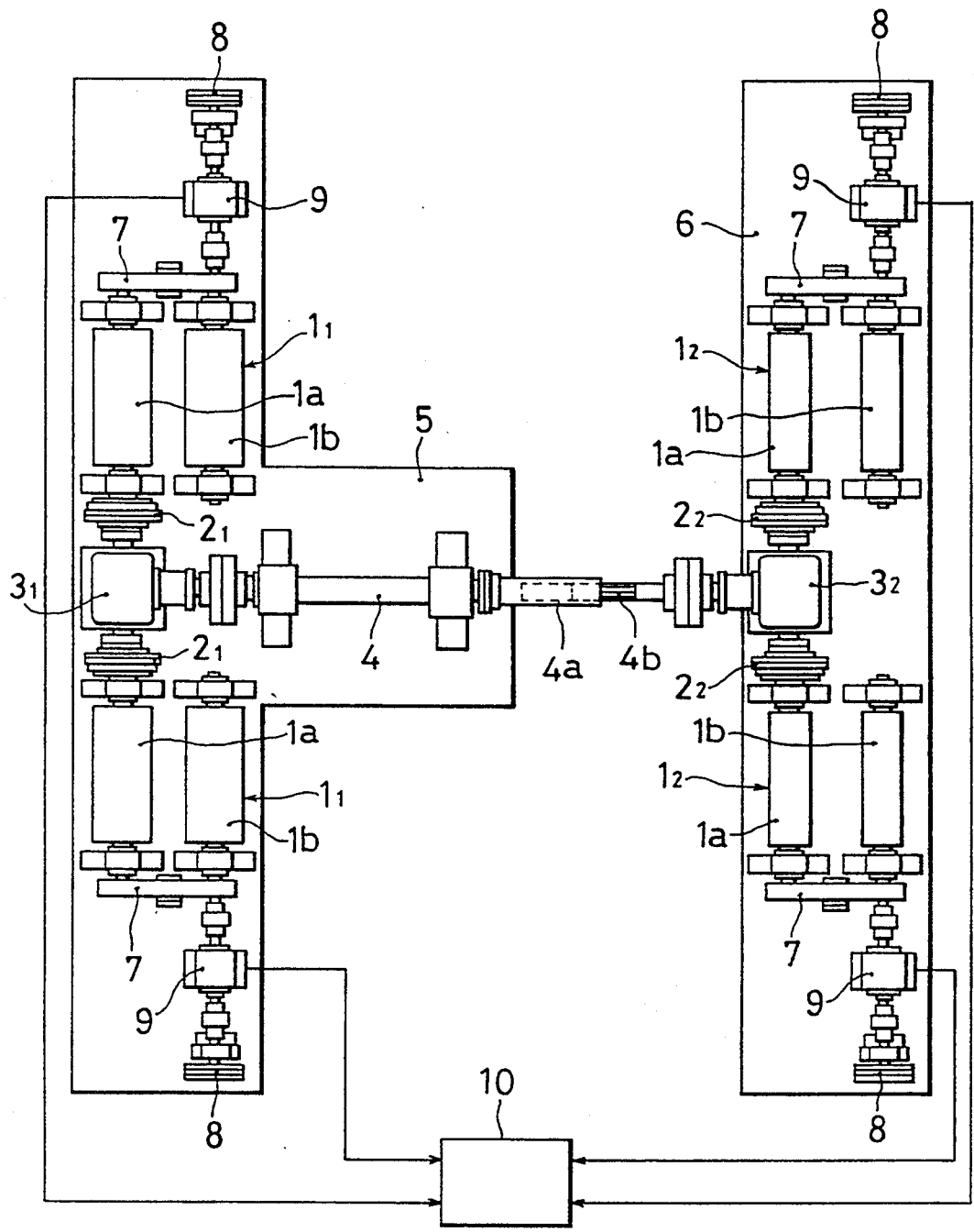
FIG. 1 is a plan view of an example of this invention apparatus.

FIG. 1 shows an apparatus for testing brakes. The apparatus is provided with a pair of right and left rolls $1_1$, $1_1$ for the front wheels as well as a pair of right and left rolls $1_2$, $1_2$ for the rear wheels of a vehicle such as a motorcar. Between the rolls $1_1$, $1_1$ for the front wheels, there is disposed a gear box $3_1$ which connects each of the rolls $1_1$ via a clutch $2_1$, respectively. Between the rolls $1_2$, $1_2$ for the rear wheels, there is disposed a gear box $3_2$ which connects each of the rolls $1_2$ via a clutch $2_2$, respectively. Both gear boxes $3_1$, $3_2$ are connected together via a drive shaft 4 so that, when the vehicle is driven while the wheels are placed on the respective rolls, the rear wheels can be rotated by the rotation of the front wheels, which are the driving wheels, via the rolls $1_1$, clutches $2_1$, gear boxes $3_1$, drive shaft 4, gear boxes $3_2$, clutches $2_2$ and rolls $1_2$.

The rolls $1_1$, $1_1$ for the front wheels are mounted on a stationary base 5, and the rolls $1_2$, $1_2$ for the rear wheels are mounted on a slidable base 6 which can be moved forward and backward. The rear portion of the drive shaft 4 is constructed in an extendible manner by a sleeve 4a and a spline shaft 4b which is fitted into the sleeve 4a. It is thus so arranged that, by the movement of the slidable base 6, the distance between the rolls $1_1$ for the front wheels and the rolls $1_2$ for the rear wheels can be adjusted depending on the wheel base of the vehicle.

Each of the rolls $1_1$, $1_2$ is made up of a pair of front and rear split rolls 1a, 1b which are connected by a belt 7 for synchronous rotation. A fly wheel 8 is connected to the rear-side split roll 1b of each of the rolls $1_1$, $1_2$. A torque meter 9 is interposed between each of the split rolls 1b and each of the flywheels 8 to detect the deceleration of each of the rolls $1_1$, $1_2$ in terms of a torque. Detected signals of each torque meter 9 are input to a monitor circuit 10 which comprises a microcomputer to perform the testing as described hereinbelow.

The friction coefficient on the external periphery of each of the above-mentioned split rolls 1a, 1b is set to such a large value that the frictional force to act, at the time of braking, between the wheels and the split rolls 1a, 1b exceeds the inertia force of the split rolls 1a, 1b inclusive of the fly wheels 8. Therefore, each of the rolls $1_1$, $1_2$ does not slip relative to each of the wheels at the time of braking but rotates at the same speed as that of the wheels. Therefore, that deceleration of each of the rolls $1_1$, $1_2$ which is detected by each of the torque meters 9 coincides with the deceleration of each of the wheels.

Figure 2:
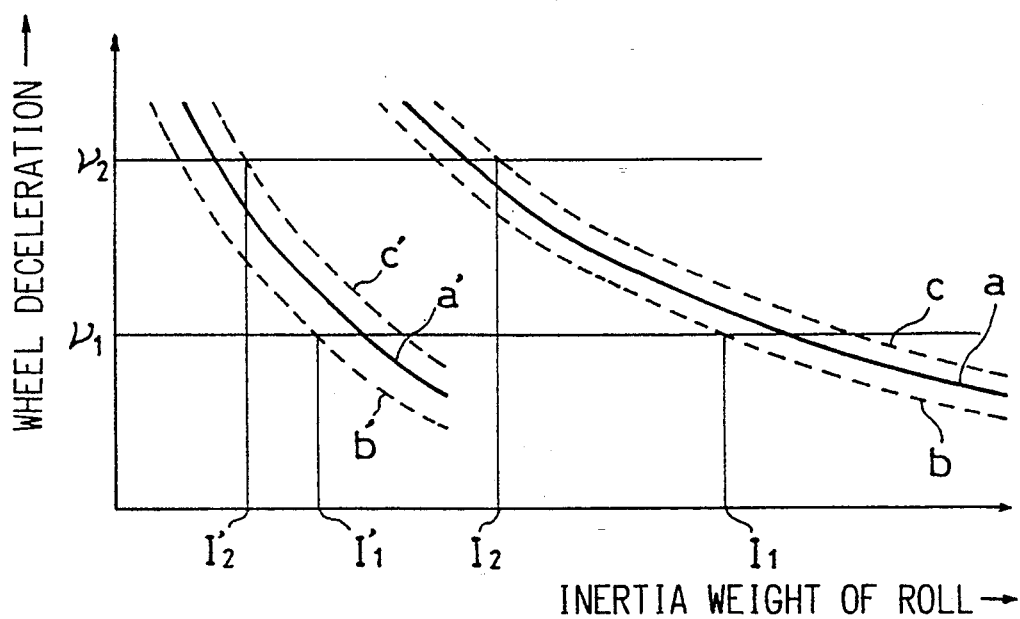
FIG. 2 is a diagram showing set ranges of inertia weight of rolls.

The inertia weight of each of the rolls $1_1$, $1_2$ inclusive of the split rolls 1a, 1b, the belt 7 and the fly wheel 8 is set to a predetermined value. This predetermined value is of such a value that the deceleration of the wheels at the time of braking can be increased beyond a predetermined level (e.g., deceleration at a standard speed Vs as described hereinbelow) that is required for starting the anti-lock control and is also of such a value that the wheels do not stop before the completion of a first reduction of the braking pressure by the anti-lock control, preferably even after an increase in the braking pressure subsequent to the first reduction of the braking pressure. Referring to FIG. 2, numeral $v\,1$ is the above-mentioned predetermined level, numeral $v\,2$ is an upper limit level of the deceleration that is required not to stop the wheels even after the increase in the braking pressure subsequent to the first reduction in the braking pressure and that is obtained on the basis of the reaction time of the increase and reduction in the braking pressure. The above-mentioned inertia weight of the rolls is set to an arbitrary value within such a range of the inertia weight that the line a falls within $v\,1$ and $v\,2$, the line a showing the change characteristics of the wheel deceleration relative to the roll inertia weight under the braking force which occurs when the brake is applied at a predetermined foot pressure to the brake pedal. In a vehicle which has just been brought out of the production line, the contact of the brake members is insufficient and, therefore, it sometimes happens that a predetermined braking force is not generated even when the brakes are applied at a predetermined foot pressure to the brake pedal. Or else, even if the contact of the brake members is sufficient, it sometimes happens that a larger braking force occurs within a tolerance. In FIG. 2, curve b shows change characteristics when the braking force is small, and curve c shows change characteristics when the braking force is large. Suppose that the inertia weight value $I_1$ when the line b exceeds $v\,1$ is an upper limit value and the inertia weight value $I_2$ when the line c falls below $v2$ is a lower limit value of the inertia weight value $I_2$. The inertia weight of each of the rolls is set within these upper and lower limit values so that the anti-lock brake system can operate even if the braking force fluctuates.

The braking force of the rear wheels becomes relatively weak due to the operation of a proportioning control valve (hereinafter abbreviated as PVC) which is provided in the brake hydraulic system for restricting the increase in the braking pressure. Under the condition of braking of the rear wheels, the change characteristics curves which correspond to the above-mentioned a, b, c, which are the change characteristics curves under the condition of braking of the front wheels, will be a', b', c' in FIG. 2. The inertia weight of each of the rolls $1_2$ for the rear wheels is set to a value within an area between an upper limit value $I'_1$ where the line b' exceeds $v1$ and a lower limit value $I'_2$ where the line c' falls below $v$ 2.

In testing the brakes, the vehicle is driven while each of the wheels is mounted on each of the rolls $1_1$, $1_2$ and, when a predetermined speed has been attained, the clutches $2_1$, $2_2$ of each of the rolls $1_1$, $1_2$ are disengaged so that each of the rolls $1_1$, $1_2$ can respectively rotate independently. Under this condition, the brake pedal is pressed.

FIGS. 4a, 4b, 4c, 4d show changes in the torques T which are detected by the torque meters 9, changes in the rotational speed V of the wheels, changes in the deceleration $v$ of the wheels and changes in the braking pressure P, when the anti-lock brake system is normally operated. The anti-lock brake system is constructed in the following manner. Namely, when the deceleration $v$ of the wheels has exceeded a predetermined set value $v$ s, the increase in the braking pressure is stopped. When the wheel speed V has become lower than a standard speed Vs which is determined according to predetermined deceleration characteristics, the braking pressure is reduced. When the deceleration $v$ has fallen below the set value $v$ s, the reduction in the braking pressure is stopped. When the wheel speed V has exceeded a standard speed Vs, the braking pressure is increased. Thereafter, the above-mentioned operations are repeated. When the wheel speed V has lowered to a predetermined low speed $V_0$, the anti-lock control is released and the wheels are finally stopped under normal braking conditions. The torque T varies with the deceleration $v$, and there appear in the waves thereof peaks which correspond to the increase and reduction controls of the braking pressure. By setting the inertia weight of each of the rolls $1_1$, $1_2$ as mentioned above, there will appear at least two peaks in the torque waves if the second reduction in the braking pressure is made subsequent to the first reduction in the braking pressure, provided that the anti-lock brake system is operated normally. When the roll comes to a stop, the elastic energy which is stored in the inertia system made up of the wheel, roll and flywheel is released and, consequently, the deceleration $v$ and the torque T once lower below zero level.

Figure 3:
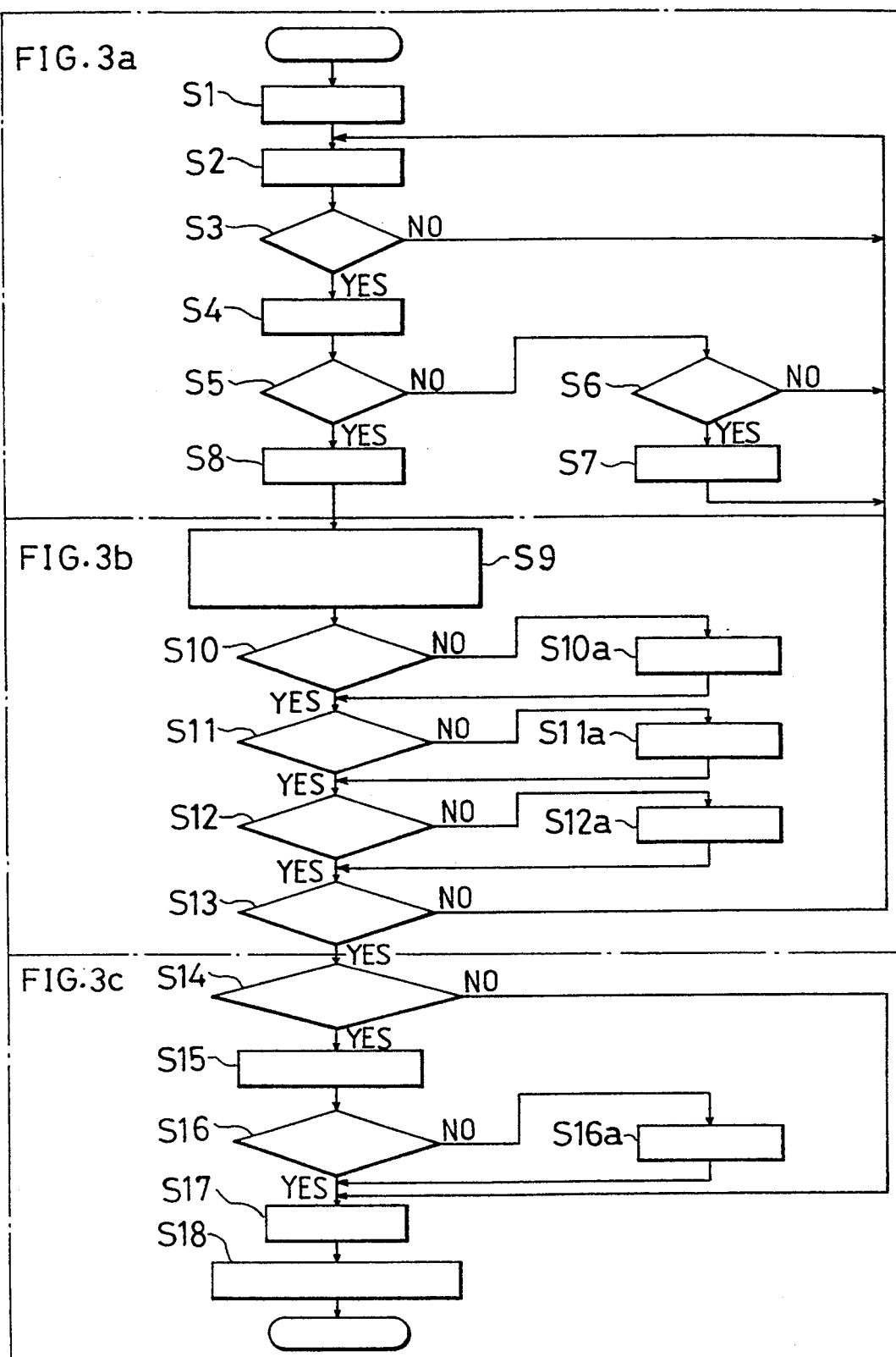
FIG. 3, shown in detail in FIGS. 3a through 3c, is a flow chart showing the procedure of testing an anti-lock brake system.
Figure 3A:
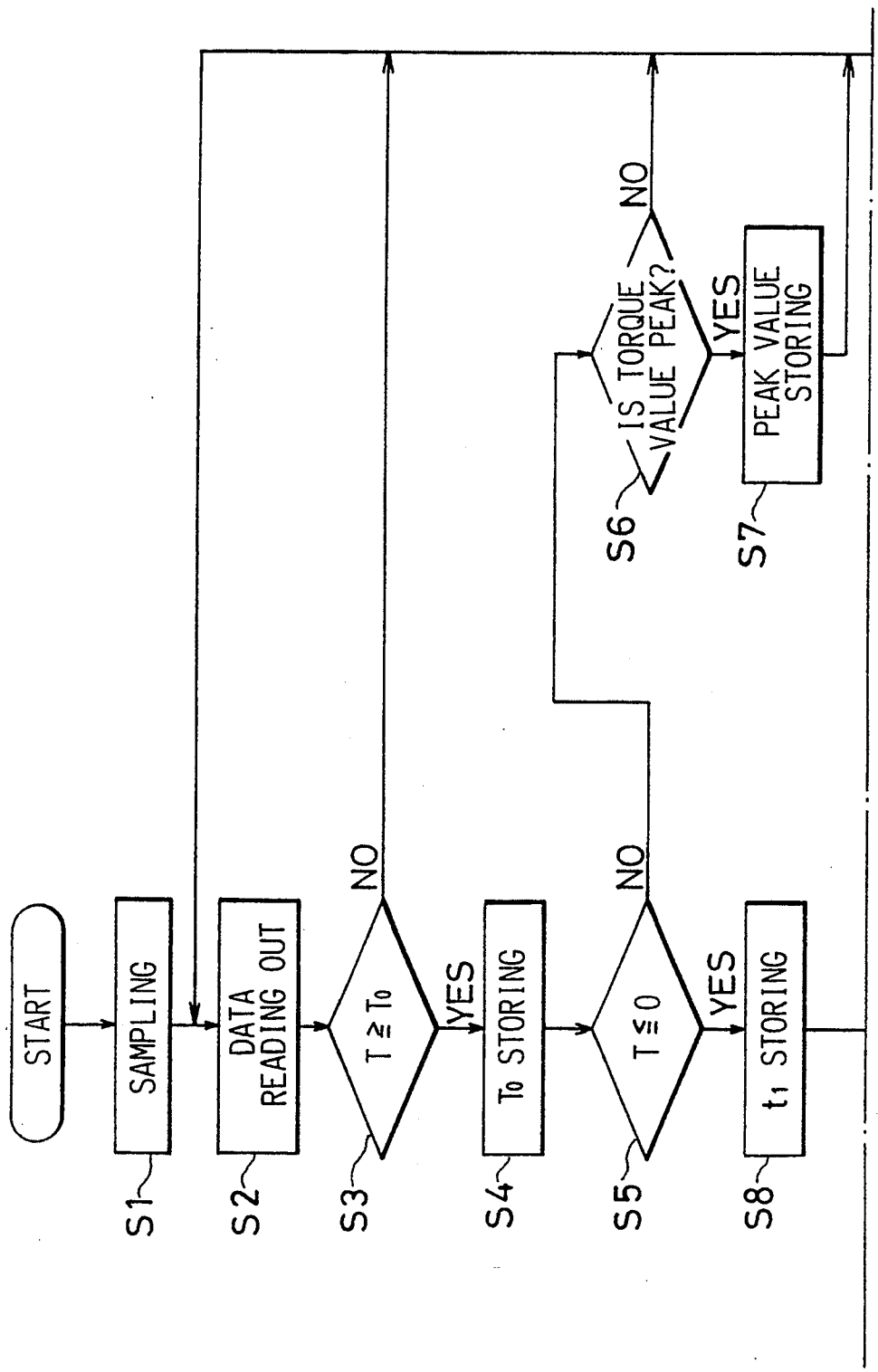
Figure 4A:
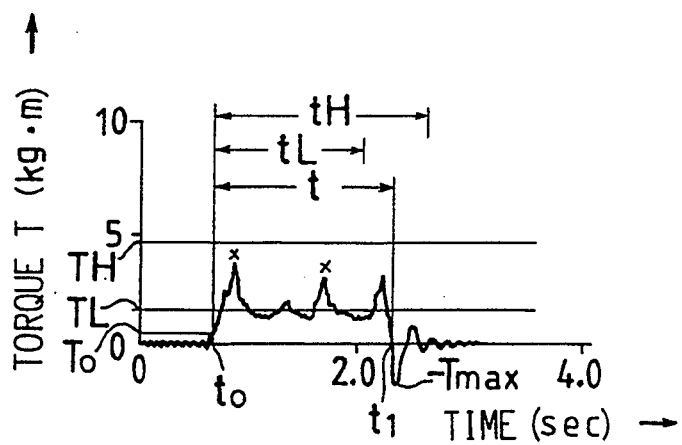
FIGS. 4a, 4b, 4c, 4d are diagrams showing torque waves, changes in wheel speed, wheel deceleration and braking pressure, respectively, when a brake is operated normally.
Figure 4B:
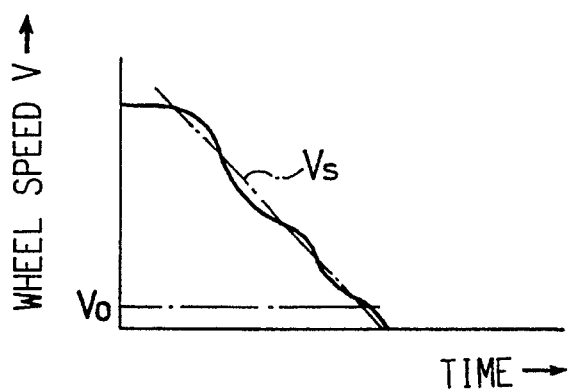
Figure 4C:
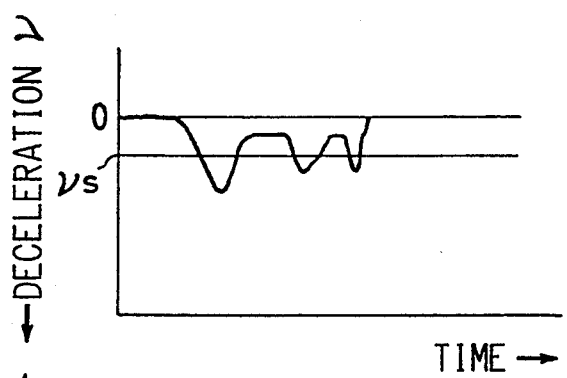
Figure 4D:
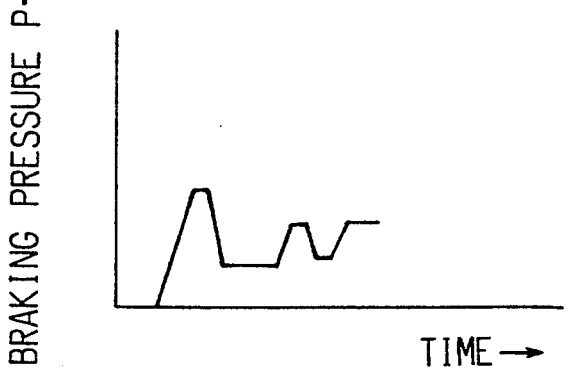
Figure 5A:
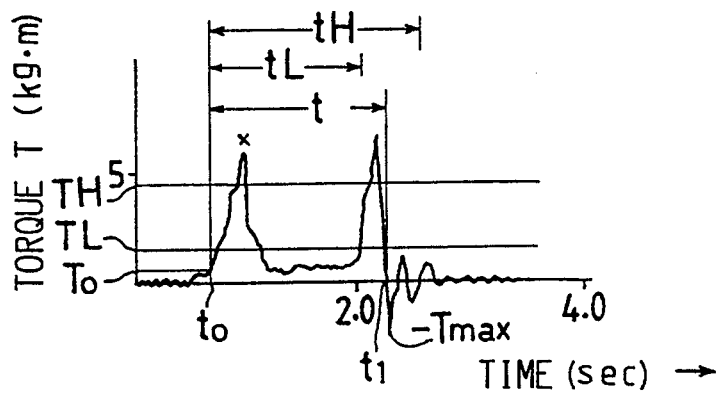
FIGS. 5a, 5b, 5c, 5d are diagrams corresponding to those in FIGS. 4a, 4b, 4c, 4d when response delays occurred in the braking pressure.
Figure 5B:
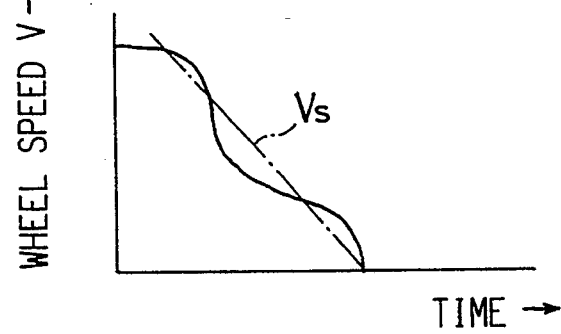
Figure 5C:
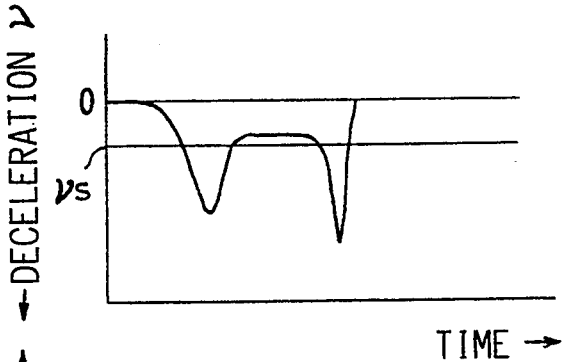
Figure 5D:
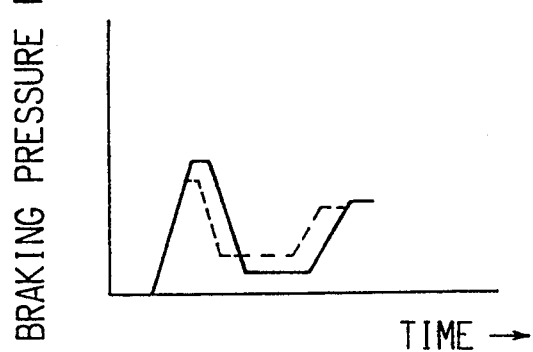
Figure 6A:
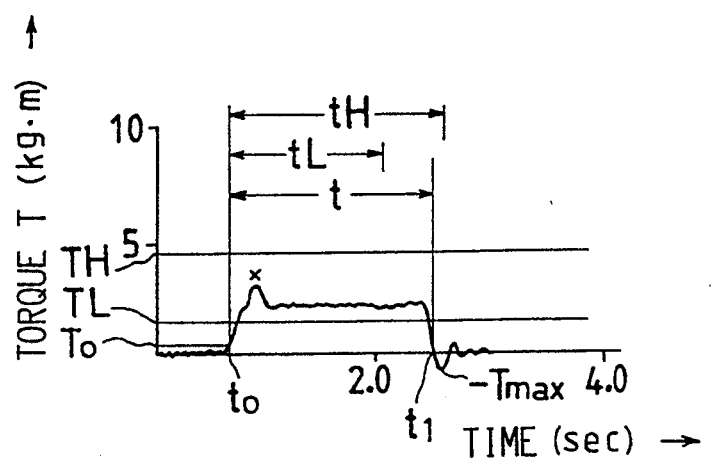
FIGS. 6a, 6b, 6c, 6d are diagrams corresponding to those in FIGS. 4a, 4b, 4c, 4d when a braking force is insufficient.
Figure 6B:
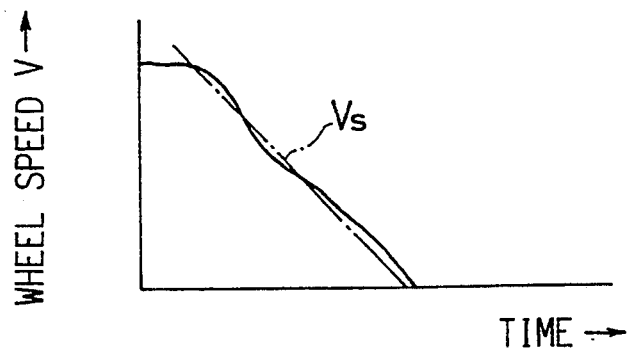
Figure 6C:
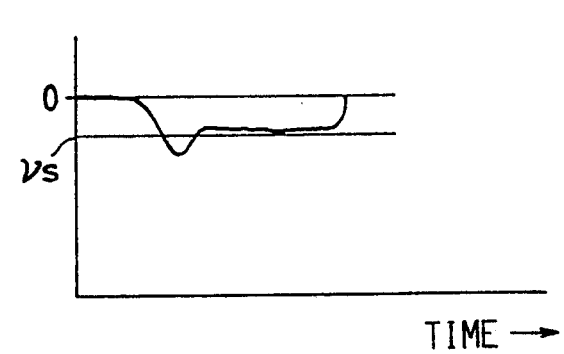
Figure 6D:
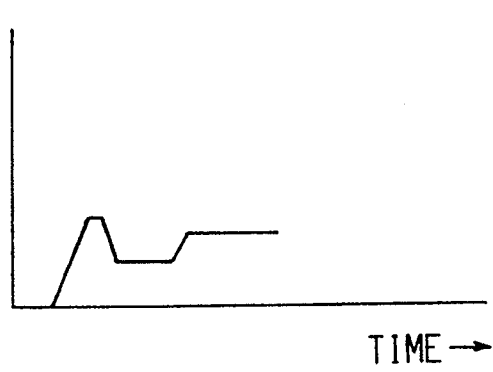

The testing step in the monitor circuit 10 is carried out in the procedure shown in FIG. 3 which is shown in detail in FIGS. 3a through 3c. In more detail, when a signal of start of braking operation is input from a control panel which is not shown, the torque to be detected by the torque meter 9 for each of the rolls $1_1$, $1_2$ is sampled at a predetermined time interval for a predetermined period of time, e.g., for 4 seconds (step S1). Then, the sampling data are read out in a time series manner for each of the rolls (step S2). The time when the torque T has exceeded a threshold value $T_0$ is stored as the time $t_0$ of start of braking operation (steps S3, S4). Then, a judgment is made to as to whether the torque T is below the zero level or not (step S5). While $T>0$, among each point of torque value, such a point is judged to be a peak that, after attaining a maximum value, a drop beyond a predetermined level, e.g., 0.8 kg.m or more, occurred (step S6). At the time of the peak, its torque value is stored as the peak value (step S7). When the torque has become below the zero level, that time is stored as the time $t_1$ of roll stop (step S8). When the roll comes to a stop, the torque suddenly drops below the zero level even if the braking pressure is not reduced. Therefore, the peak just before the roll stop cannot be regarded to be identical to the peaks that occur by the increase or reduction in the braking pressure. The peak at the time just before $t_1$ is therefore not counted.

Then, the braking time t is computed from the time difference between $t_0$ and t1 and, at the same time, the number of peaks that occurs during the braking time is calculated from the stored number of peaks (step S9). A judgement is made as to the acceptability or unacceptability by comparing the number of peaks, the values of the peaks and the braking time with respectively set standard values (steps S10, S11, S12 ). The standard value of the number of peaks is set to "2" for example. If the value is above 2, it is considered to be acceptable and, if the value is "0" or "1," it is considered to be unacceptable and NG data are prepared (step S10a). As regards the values of the peaks and the braking time, if they are within the allowable ranges between the respectively set lower limit values TL, tL and the upper limit values TH, tH, they are considered to be acceptable. If they are outside these allowable ranges, they are considered to be unacceptable and NG data are prepared (steps S11a, S12a).

FIGS. 5a, 5b, 5c, 5d show test results in case response delays have occurred due to entrainment of air into the hydraulic system, or the like. As compared with the normal changes in the braking pressure as shown by a dotted line in FIG. 5d, the changes in the braking pressure are delayed. Although the braking time is acceptable, the number of peaks (the one marked with an "x" is the counted peak) becomes unacceptable and the value of peak also becomes unacceptable because it exceeds the upper limit value TH.

The test results shown in FIGS. 6a, 6b, 6c, 6d correspond to the following case. Namely, despite the increase in the braking pressure after the wheel speed has exceeded the standard speed subsequent to a first control to reduce the braking pressure, the braking force does not sufficiently increase and, consequently, the wheel speed is decreased at a deceleration near the deceleration characteristics of the standard speed while exceeding the standard speed. Although the braking time and the values of the peaks are acceptable, the number of peaks is unacceptable. When the braking force is absolutely insufficient, the braking time becomes longer and, at the same time, the wheel speed is slowly decelerated without the wheel speed's lowering below the standard speed, whereby no peak is generated. Consequently, all of the braking time, number of peaks and the values of the peaks become unacceptable.

Figure 7:
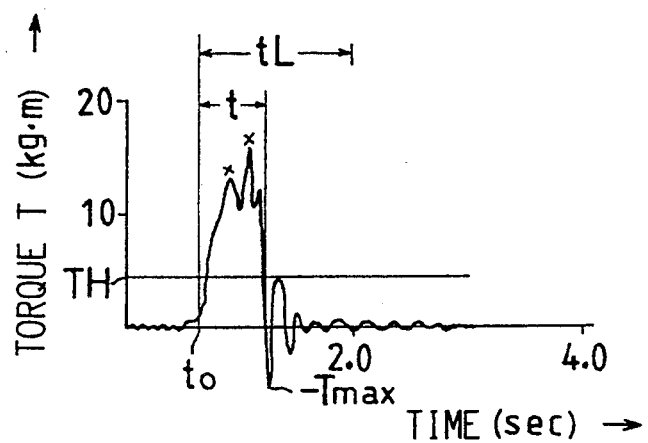
FIG. 7 is a diagram showing the torque waves under normal braking conditions.

FIG. 7 shows test results when the anti-lock brake system does not work and, consequently, the wheels are quickly braked. In such a case of quick braking, the wheels are sometimes caused to move backwards due to the inertial rotational force, thereby causing a second peak to appear. Although the number of peaks are acceptable, the braking time becomes unacceptable because it is below the lower limit value tL and, at the same time, the peak value also becomes unacceptable because it exceeds the upper limit value TH.

If foreign matters such as trashes are adhered to the brake pads, the foreign matters are sometimes scratched off by the brake discs when the braking pressure is kept at a low pressure, i.e., when the torque is below the lower limit value TL. In such a case, the torque will once drop and a peak will appear just before the drop. The peak value at that time will be below the lower limit value TL and, therefore, the adhesion of foreign matters can be detected.

As described above, based on the acceptable or unacceptable patterns showing which of the braking time, the number of peaks and the values of peaks is/are acceptable and which is/are not, the cause of malfunctioning of the anti-lock brake system can be estimated.

In case the deceleration just before the stop of the wheels becomes large because the anti-lock control is released at a higher speed than the above-mentioned $V_0$ at which the anti-lock control is released, the amount -Tmax of lowering below the zero level of the torque to be generated at the time of stopping becomes large. Therefore, by comparing this lowered value with the standard value, it is also possible to judge that the anti-lock brake system is unacceptable when the lowered value exceeds the standard value.

As regards the rear wheels, they are sometimes decelerated and come to a stop while maintaining the deceleration characteristics of the standard speed, due to the effects of the above-mentioned PCV.

FIGS. 8a, 8b, 8c, 8d show changes in the torque T which is detected by each torque meter 9, changes in the rotational speed V of the wheels, changes in the deceleration $v$ of the wheels and changes in the braking pressure P, when the rear brakes provided in the hydraulic system thereof with the PCV, are normally subjected to the anti-lock brake control. At the time of starting the braking operation, once the braking pressure has reached a predetermined value Ps, the braking pressure thereafter increases gradually due to the operation of the PCV. When the deceleration $v$ has exceeded the predetermined set value $v$s, the increase in the braking pressure is stopped. When the wheel speed V lowers below the standard speed Vs, the braking pressure is reduced until the deceleration $v$ becomes smaller than $v$s. When the wheel speed V becomes higher than the standard speed Vs, the braking pressure is increased. Thereafter, the above-mentioned operations are repeated. Finally, when the wheel speed V has lowered down to the predetermined low velocity $V_0$, the anti-lock control is released, and the wheels are braked under the normal braking conditions until the wheels and the rolls are stopped. While the anti-lock control is being performed, the wheels are decelerated substantially at a constant deceleration which is in accordance with the deceleration characteristics of the standard speed Vs, and there appear no large peaks in the torque T. Accordingly, even if the braking time becomes acceptable, the number of peaks becomes unacceptable. Similarly, in case the braking force is insufficient, the number of peaks becomes sometimes unacceptable while the braking time is acceptable. It is then difficult to judge whether the result is due to the PCV effect or not.

In such a case, suppose that the allowable range is set by making the value of the deceleration at which the anti-lock control is started, i.e., the value corresponding to the above-mentioned $v$s, to be the lower limit value TL1 and by making the value corresponding to the maximum deceleration at which the wheels are not locked, to be the upper limit value TH1. When the anti-lock brake system operates normally, the maximum torque Tmax1 which occurs before the lapse of a predetermined time (e.g., 0.3 second) from the start of the braking operation falls within the allowable range. However, when the braking force is insufficient, as shown by a dotted line a in FIG. 8a, the torque does not increase up to TL1 at the time of lapse of ts. When the anti-lock brake system does not work but the braking pressure suddenly increases, as shown by a dotted line b in FIG. 8a, the torque exceeds the TH1 at the time of lapse of ts. It follows that, when the Tmax1 is not within the allowable range, the brake can be judged to be abnormal.

In case a response delay occurs to the control of the braking pressure due to the entrainment of the air into the hydraulic system, or the like, as shown by a dotted line c in FIG. 8a, the width of variations of the torque becomes large (due to the operation of the PCV, there will be no such rapid change as can be detected as a peak). Consequently, the torque does not fall within that allowable range between the lower limit value TL2 and the upper limit value TH2 which is determined by the normal operating conditions of the anti-lock control.

Taking the above points into consideration, in this embodiment, the following procedure is followed as shown in FIG. 3. Namely, when the judgement as to the acceptability or unacceptability of the above-mentioned braking time, the number of peaks and the values of peaks has been finished for all of the 4 wheels (step S13), a judgement is made as to whether the braking time of the rear wheels has been considered to be acceptable and whether the number of peaks has been considered to be unacceptable (step S14). When the number of peaks is "0" or when the number of peaks is "1" and the value of the peak is acceptable, the sampling data of the rear wheels are read out again, and the maximum torque Tmax1 that occurred within the time from the point $t_0$ of start of braking operation to the end of the predetermined set time ts as well as the maximum torque Tmax2 that occurred within the time after the lapse of the set time ts to the time $t_1$ of the roll stop are searched (step S15). Then, a judgement is made as to whether Tmax1 is within the allowable range between TL1 and TH1 as well as whether Tmax2 is within the allowable range between TL2 and TH2 (step S16). If they are within the allowable ranges, they are regarded to be acceptable and, if they are outside the allowable ranges, they are regarded to be unacceptable and NG data are prepared (step S16a). Finally, the data of judgement whether each of the 4 wheels is acceptable or not are output, and the torque wave forms for each of the wheels are printed out (steps S17, S18).

The judgement may also be made as to whether the torque at each point after the lapse of ts falls within the allowable range of TL2 and TH2. However, in the brakes which are provided in the hydraulic system thereof with the PCV, the changes in the deceleration are restricted due to the operation of the PCV. Therefore, in this embodiment, only the Tmax2 is detected to judge whether this value falls within the allowable limit or not.

In addition, in this embodiment, it is so arranged that the acceptability and unacceptability of the number of peaks and the values of the peaks are judged also with reference to the rear wheels. However, as far as the rear wheels are concerned, a judgement may be made only as to the braking time and Tmax1 and Tmax2.

Figure 9:
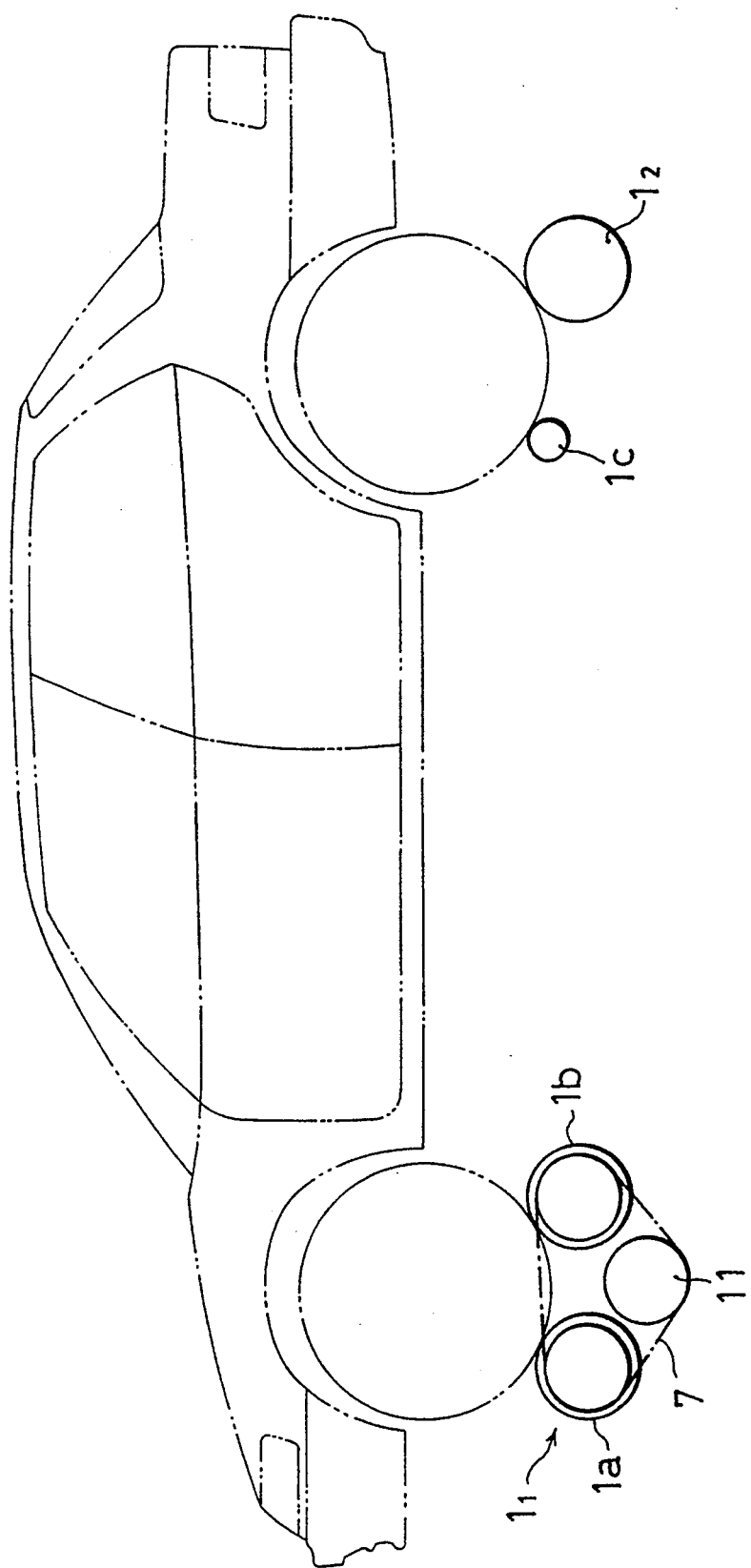
FIG. 9 is a schematic side view of rolls for the front wheels and rear wheels according to another example of this invention apparatus.

Since the braking force of the rear wheels is relatively small, the inertia weight of each of the rolls $l_2$ for each of the rear wheels must be set to a relatively small value so that, at the time of braking, the deceleration of the rear wheels is increased above such a predetermined level as is required for starting the anti-lock control. It follows that, if the rolls $1_2$ are constituted, as shown in FIG. 1, by a pair of front and rear split rolls $1a$, $1b$ which rotate synchronously, the split rolls $1a$, $1b$ will naturally have to be formed respectively into small-diameter and light ones. Accordingly, it becomes difficult to secure the bending rigidity of each of the split rolls $1a$, $1b$. As a solution, as shown in FIG. 9, only each of the rolls $1_1$ for the front wheels is constituted, like in the above-mentioned embodiment, by a pair of front and rear split rolls $1a$, $1b$ which rotate synchronously via a belt 7, and each of the rolls $1_2$ for the rear wheels is constituted by a single roll. According to this arrangement, the rolls $1_2$ for the rear wheels can be made in relatively large diameter, thereby securing a large bending rigidity. In front of the rolls $1_2$ for the rear wheels there are parallelly provided auxiliary rolls $1c$ which support the front sides of the rear wheels to prevent them from falling downwards. These auxiliary rolls $1c$ are arranged to rotate freely independent of the rolls $1_2$ for the rear wheels. Therefore, the inertia weight of the auxiliary rolls $1c$ are not added to the inertia weight of the rolls $1_2$ for the rear wheels. The vehicle body is fixed in its longitudinal position at the front wheels by means of the pair of front and rear split rolls $1a$, $1b$ which constitute the rolls $1_1$ for the front wheels. In addition, the width of changes in the braking force due to the anti-lock control of the rear wheels is small. Therefore, the rear wheels are always pressed against the rolls $1_2$ for the rear wheels and, consequently, the rolls $1_2$ rotate, during braking, always at the same rotational speed as that of the rear wheels. In FIG. 9, numeral 11 is a tension pulley for the belt 7.

It is readily apparent that the above-mentioned apparatus and method of testing an anti-lock brake system have the advantages of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An apparatus for testing an anti-lock brake system on wheels of a motor car, said apparatus having rolls for supporting each of the wheels of the motorcar to be tested, means for detecting rotational changes of said rolls for each of said wheels after said motor car having an anti-lock brake system to be tested is mounted thereon with said wheels of said motor car placed on said rolls and said anti-lock brake system is actuated after a predetermined speed of said wheels on said rolls has been attained, and means for judging operating conditions of said anti-lock brake system from changes in rotational speed of each of said rolls at a time of braking, wherein:

a friction coefficient of each of said rolls is set to such a value that a frictional force acting between each of said rolls and each of said wheels at the time of braking exceeds an inertia force of each of said rolls;

an inertial of each of said rolls is set to such a value that deceleration of each of said wheels at the time of braking can be increased to above a predetermined level required to start an anti-lock control of said anti-lock brake system being tested and that each of said wheels does not stop before the completion of a first braking pressure reduction by said anti-lock control;

means for detecting deceleration of each of said rolls;

means, based on a detected deceleration, for obtaining a braking time required from a time of start of braking operation to a time of stop of each of said rolls;

means for obtaining a maximum value of deceleration that occurs within a time form the start of braking operation to the end of a predetermined set time; and means for judging whether said braking time and said obtained maximum value are each within an allowable range.

2. An apparatus for testing an anti-lock brake system according to claim 1, further comprising means for judging whether the deceleration of each of said rolls during a time after lapse of said set time to a stop of each of said rolls is within an allowable range.

3. An apparatus for testing an anti-lock brake system according to claim 1, further comprising means for obtaining a maximum deceleration of each of said rolls that occurs within a time from said lapse of said set time to said stop of each of said rolls, and means for judging whether obtained maximum deceleration is within a predetermined allowable range.

4. An apparatus for testing an anti-lock brake system according to claim 1, further comprising means for obtaining an amount of lowering below zero level of deceleration of each of said rolls which occurs at said time of stop of each of said rolls, and means for judging whether said amount of lowering is below a predetermined standard value.

5. A method of testing an anti-lock brake system in which a vehicle having mounted thereon said anti-lock brake system is run while wheels of said vehicle are placed on respective rolls and said anti-lock brake system is actuated when a predetermined speed of said rolls has been attained to inspect said anti-lock brake system, said method comprising the steps of:

measuring a braking time required from a time of start of braking operation to a time of stop of each of said rolls;

measuring a maximum deceleration of each of said rolls that occurs within a time from the start of braking operation to the end of a predetermined set time; and comparing said braking time and said maximum deceleration, measured, respectively, int he preceding steps, with respectively set standard values to judge whether said anti-lock brake system is acceptable.

6. A method of testing an anti-lock brake system according to claim 5, further comprising the step of judging whether the deceleration of each of said rolls during the time after the lapse of said set time to said stop of each of said rolls is within an allowable range.

7. A method of testing an anti-lock brake system according to claim 5, further comprising the steps of measuring a maximum deceleration of each of said rolls that occurs within a time after the lapse of said set time to the stop of each of said rolls; and judging whether said maximum deceleration is within a predetermined allowable range.

8. A method of testing an anti-lock brake system according to claim 5, further comprising the steps of measuring an amount of lowering below zero level of deceleration of each of said rolls which occurs at the time of stop of said rolls; and judging whether said amount of lowering is below a predetermined standard value.

* * * * *

UNITED STATES PATENT AND TRADEMARK OFFICE
CERTIFICATE OF CORRECTION

PATENT NO.  : 5,339,682
DATED       : 8/23/94
INVENTOR(S) : WATANABE et al.

It is certified that error appears in the above-identified patent and that said Letters Patent is hereby corrected as shown below:

Cover page, Item [30], change "Feb. 12, 1992 [JP] Japan 3-025521" to --Feb. 12, 1992 [JP] Japan 4-025521--.

Claim 1, column 11, line 63, change "inertial" to --inertia--.

column 12, line 9, change "form" to --from--.

Claim 5, column 12, line 46, change "int he" to --in the--.

Signed and Sealed this

Fourteenth Day of February, 1995

Attest:

BRUCE LEHMAN

Attesting Officer                Commissioner of Patents and Trademarks